(12) United States Patent (10) Patent No.: US 8,752,169 B2
Long et al. (45) Date of Patent: Jun. 10, 2014

(54) BOTNET SPAM DETECTION AND FILTRATION ON THE SOURCE MACHINE

(75) Inventors: Men Long, Hillsboro, OR (US); David Durham, Beaverton, OR (US); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 726 days.

(21) Appl. No.: 12/059,877

(22) Filed: Mar. 31, 2008

(65) Prior Publication Data

US 2009/0249481 A1 Oct. 1, 2009

(51) Int. Cl.
*H04L 29/06* (2006.01)
*G06F 21/56* (2013.01)
*G06F 21/50* (2013.01)

(52) U.S. Cl.
CPC .......... *G06F 21/566* (2013.01); *H04L 63/1408* (2013.01); *H04L 63/1441* (2013.01); *G06F 21/50* (2013.01); *G06F 21/56* (2013.01); *H04L 63/14* (2013.01); *H04L 63/145* (2013.01)
USPC ......................................................... 726/22

(58) Field of Classification Search
CPC ....... G06F 21/50; G06F 21/56; G06F 21/566; H04L 63/14; H04L 63/1408; H04L 63/1441; H04L 62/145
USPC ................................................... 726/25, 22
See application file for complete search history.

(56) References Cited

U.S. PATENT DOCUMENTS

| | | | |
|---|---|---|---|
| 2004/0199592 A1* | 10/2004 | Gould et al. ................... | 709/206 |
| 2005/0086507 A1* | 4/2005 | Shoji et al. ..................... | 713/200 |
| 2007/0255821 A1* | 11/2007 | Ge et al. ......................... | 709/224 |
| 2008/0028463 A1* | 1/2008 | Dagon et al. .................... | 726/22 |
| 2008/0086555 A1* | 4/2008 | Feinleib ......................... | 709/224 |
| 2008/0196094 A1* | 8/2008 | Benschop et al. ................ | 726/5 |
| 2008/0307526 A1* | 12/2008 | Chung et al. .................... | 726/23 |
| 2008/0320095 A1* | 12/2008 | Pearson et al. ................. | 709/207 |
| 2009/0150992 A1* | 6/2009 | Kellas-Dicks et al. .......... | 726/19 |
| 2009/0172815 A1* | 7/2009 | Gu et al. ......................... | 726/23 |
| 2009/0240800 A1* | 9/2009 | Yee ............................... | 709/224 |

* cited by examiner

*Primary Examiner* — Michael S McNally
(74) *Attorney, Agent, or Firm* — Barnes & Thornburg, LLP

(57) ABSTRACT

A method and device are disclosed. In one embodiment the method includes determining that a packet attempting to be sent from a first computer system has at least a portion of a human communication message that may contain spam. The method then increments a spam counter when the difference in time between a first time value in a time stamp within the packet and a second time value of a most recent activity from a human input device coupled to the first computer system is greater than a threshold difference in time value. The method also disallows the packet to be sent to a remote location if the spam counter exceeds a spam outbound threshold value.

15 Claims, 3 Drawing Sheets

BOTNET SPAM DETECTION AND FILTRATION ON THE SOURCE MACHINE

FIELD OF THE INVENTION

The invention relates to detecting and dealing with outbound spam messages at the source machine of the spam.

BACKGROUND OF THE INVENTION

A "botnet" is a large number of Internet-connected computing machines/systems that lie in wait for remote commands from one or a few controlling computers. These systems have been compromised and run automated scripts and programs which many times are capable of sending out massive amounts of spam emails, voice-over-internet-protocol (VoIP) messages, and many other types of Internet communications.

One basic characteristic of botnet malicious software is its automated nature. An automated computer program that sends spam messages to many targets could run on a computing machine without the knowledge of the user of the computer machine. The malicious software can function without any input from a user, since the automated nature allows the software to be triggered by packets sent from a malicious remote user (i.e. a hacker) located many miles away.

There are many existing anti-spam technologies such as Internet service provider (ISP) background checks on customers, digital signatures on emails, firewalls, etc. Today, a vast majority of all emails sent worldwide are spam messages, and it is theorized that more than 80% of all the spam messages are generated by botnet machines manipulated by relatively few professional spam gangs.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method and device of a botnet spam detection and prevention technology are described. Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
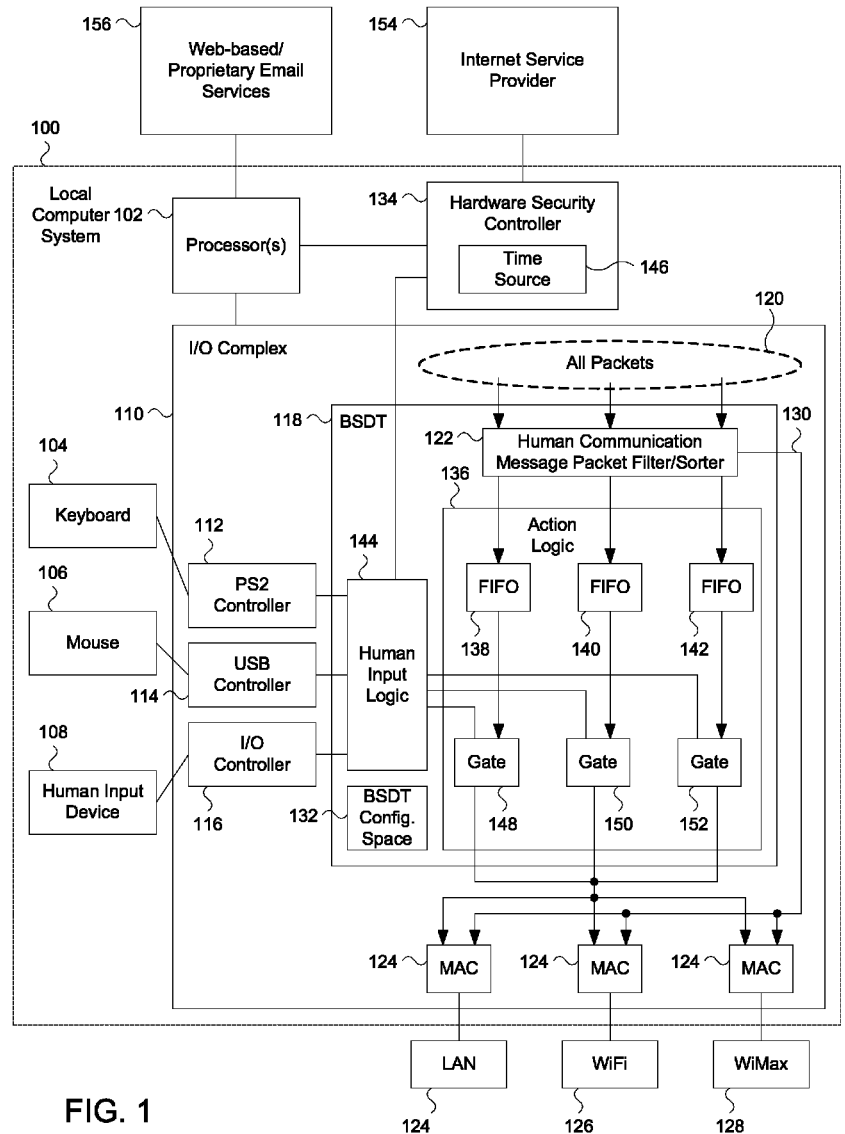
FIG. 1 illustrates an embodiment of a botnet spam detection technology (BSDT) architecture.

FIG. 1 illustrates an embodiment of a botnet spam detection technology (BSDT) architecture. In many embodiments, the BSDT logic resides on a computer system, such as local computer system 100. Local computer system may be a desktop computer system, laptop computer system, server computer system, workstation computer system, television set-top computer system, handheld computer system, or any one of many other types of computer systems.

The computer system includes one or more processors 102. Each processor may have one or more cores in different embodiments. The computer system also includes a memory subsystem to store data and instructions operated on by the one or more processors 102 as well as any input/output (I/O) devices capable of direct memory access. I/O devices coupled to the local computer system may include a keyboard 104, a mouse 106, one or more additional human input devices 108, as well as any number of other I/O devices that are not shown in FIG. 1 such as mass storage devices, video display devices, etc.

The one or more additional human input devices 108 may include devices such as video cameras or microphones that input video and audio, respectively, into the computer system from a human user. Thus, a human user can interact with the local computer system 100 using human input from a keyboard with keystrokes, a mouse (or other pointing device such as a trackball or laptop touchpad) with mouse movement and clicks, a video camera with motion detection, or a microphone with voice commands. In many other embodiments, there are many other potential human input devices as well that can also relay human input into the local computer system 100 (e.g. a fingerprint scanning device).

In many embodiments, there are multiple I/O controllers located in an I/O complex 110 that receive human input from one or more of the human input devices listed above. For example, PS2 controller 112 (e.g. a standard 8042 keyboard controller) receives input from keyboard 104, Universal Serial Bus (USB) controller 114 receives input from mouse 106, and I/O controller 116 receives input from other human input device 108.

I/O complex 110 may have many functions in different embodiments, such as the location within the local computer system that most or all I/O host controllers reside (such as controllers 112, 114, and 116). I/O complex 110 also may couple the processor(s) 100 and memory subsystem to one or more other I/O devices such as mass storage devices.

In many embodiments, I/O complex 110 also includes portions of the logic that comprises the BSDT architecture (BSDT 118). BSDT 118 receives packets 120 that are generated from a location within local computer system 100. A portion of these packets are human communication message packets, which are packets of information that each contain at least a portion of a supposedly human-originated message. Human originated messages include all types of email, voice-over-internet protocol (VoIP) message transmissions, short message service (SMS) messages, as well as many other types of communications that a human user would supposedly initiate (other examples may include web communications such as web account registration messages and web blog comment messages, among others).

All of the above listed communications, as well as many other types of communications that aren't listed, are generally thought of as being physically initiated by a human user. For example, when an email is sent from a first computer system to a second computer system, it's normally assumed that a person typed in a message on the sending system and clicks the "send" button, which sends the email. This normal process involves human interaction on the sending computer (i.e. the actual typing on the keyboard and the point-and-click sending process). Thus, in many embodiments, all of the above listed packet types assume that a human initiated the message being sent through some form of human interaction with the computer system (e.g. keystrokes, mouse clicks, voice commands, etc.). Thus, if a packet arrives at the I/O complex and is thought to have human interaction associated with its creation, it is deemed a human communication message packet.

Immediately after a packet arrives at BSDT 118, the first task BSDT 118 performs is to determine whether the received packet is a human communication message packet or some other form of packet. Not all packets are human communication message packets. For example, streaming an audio file from one computer to another requires a stream of packets that each contain a portion of the audio file. This type of packet stream does not necessarily require human interaction to initiate (e.g. the local computer system could be a music server for other computer systems and an audio file stream upload may begin automatically in response to a request for the particular file. Thus, human communication message packets are filtered out from other packets and sorted to a given stream of a particular type of human communication message packet by the human communication message packet filter/sorter 122.

As mentioned above, there are a number of types of human communication message packets, such as different forms of email or VoIP packets. The filter/sorter 122 may apply one or more filter/sorter algorithms to determine 1) if the packet is a human communication message packet in general, and then 2) if the packet is a human communication message packet, what type it is.

Immediately after the packet arrives, the filter/sorter 122 determines the destination outbound port as well as the protocol the packet is utilizing. The port can be a local area network (LAN) port 124, a WiFi port 126, a WiMax port 128, or any other type of port that may be present on the local computer system 100. In many embodiments, there are three standardized protocols utilized to send emails across the Internet: HTTP (hypertext transport protocol), SMTP (simple mail transfer protocol), and HTTPS (hypertext transport protocol over secure socket layer). These email-compatible protocols each require multiple underlying protocols. Specifically, a packet that contains an email with one of the above three protocols requires IP (Internet protocol) and TCP (transmission control protocol) protocols. Thus, in many embodiments, the first filter utilized by the filter/sorter 122 is an IP filter. Only an IP packet is allowed to pass through the IP filter. All other packets targeting a port are sent around the entire BSDT 118 on link 130 and arrive directly at the target port.

The second packet filter the filter/sorter 122 applies is a TCP filter. Only an IP packet that also utilizes a TCP protocol is allowed to pass through the TCP filter. Again, all other packets targeting a port are sent around the entire BSDT 118 on link 130. At this point, the filter/sorter 122 determines if the TCP/IP packet is a HTTP, SMTP, or HTTPS protocol packet. If the packet utilizes one of those three protocols, then it must be determined if the packet actually contains a portion of a human communication message.

Human communication message determination may utilize a number of different signatures that are identifiable. For example, an SMTP packet generally involves at least a portion of an email. Additionally, in the header of an SMTP packet, there may be a "MAIL FROM" phrase of text. This signifies that the packet does have at least a portion of an email contained within. Other phrases also common to SMTP email packets may be utilized, such as "HELO", "RCPT TO:", and "DATA", among others.

HTTPS packets containing portions of an email may have a recognizable email signature during the received public key certificate from a server in an SSL (secure socket layer) handshake. HTTP packets have similar web email keywords that are searchable in the packet. In many embodiments, the web email server could modify its requirements for packets it receives to include a field with the value "web_send_email" or similar. One way to achieve this result is to include this value (or a similar value or tag) as part of the name of the web page of the web email server. Thus, the local computer platform the BSDT 118 resides upon would be required to generate email packets with an identifiable email signature for the web email server to accept the packet.

Other types of spam including SMS, blog comments, web account registrations and others could similarly require a hidden signature to be present in any given packet sent from the client for the server to accept the packet.

For VoIP spam, the BSDT 118 analyzes any outgoing packet that utilizes the open-standard SIP (session initiation protocol) protocol. One requirement in an outgoing packet that initiates an outgoing call is that an INVITE command be sent. Thus, if an INVITE command is found in an outgoing packet, it can be determined that an outbound VoIP call is being initiated.

Many other examples are possible for determining whether a portion of a human communication message is contained in an outbound packet of a given protocol. The protocol filtering rules may be updated on a regular basis as protocols themselves are updated and modified. In many embodiments, BSDT configuration space 132 stores all relevant rules for filtering. In some embodiments, this storage may only be updated through a secure transaction initiated by a hardware security controller 134 in the local computer system 100.

Each human communication message packet is time stamped to determine the time in which it was generated.

As soon as a packet has been determined to contain at least a portion of a human communication message, the filter/sorter 122 sorts the packet and sends it to the action logic unit 136 within the BSDT 118. The packet arrives at a FIFO (first-in first-out) buffer storing that particular type of packet within the action logic unit 136 (i.e. FIFOs 138, 140, and 142). This allows different protocol packets to be uniquely treated. The FIFO controls the speed at which the human communication message packet is acted upon. For example, there is a threshold delta of time (in both the positive and negative direction—forward and backward in time) between the moment a human communication message packet arrives and when a human input interaction is required to take place for the packet not to be deemed spam. The FIFO holds packets for this predetermined amount of time.

At the same time the human communication message packets are arriving in the FIFOs, a human input logic unit 144 is constantly monitoring all of the I/O controllers connected to human input devices (controllers 112, 114, and 116). The human input logic unit 144 communicates with the hardware security controller 134 and receives a time stamp from a time source 146 accessible by the hardware security controller 134. In some embodiments, the hardware security controller 134 is an Intel® Active Management Technology (AMT) device. In other embodiments, the hardware security controller 134 may be related to the Broadcom® DASH (Desktop and Mobile Architecture for System Hardware) web services-based management technology. In yet other embodiments, the hardware security controller 134 may by another security management technology.

In many embodiments, the hardware security controller 134 is capable of providing a secure time stamp to provide a trusted accurate time at which a given human input occurs. Each human input received by the human input logic 144 is given a secure time stamp by the hardware security controller 134 and then sent to gate logic (e.g. gates 148, 150, and 152). The gate logic does a time stamp comparison between the most recent time stamped human input and a given human communication message packet with its own origination time stamp. As stated above, if the difference between these two time stamps surpasses a threshold value, the packet may be marked as containing spam. The delta in time threshold value may be stored as a configurable value in the BSDT configuration space 132.

The time source 146, which may be referred to as a trusted time source, may be a hardware time source that is isolated from an operating system running on the local computer system. In many embodiments, the hardware security controller 134 has the capability to utilize the trusted time source as well as the information from the activity of one or more human input devices to authenticate the activity as well as authenticate and verify the time the activity takes place.

In many embodiments, action logic 136 includes a spam counter (not shown). The spam counter counts the number of outbound human communication message packets that have been marked as spam. These "outbound" packets are targeting a location (e.g. a computer system) external from the local computer system. Additionally, in many embodiments, action logic 136 compares this spam count to a threshold outbound packet spam count. The outbound threshold spam count may also be stored as a configurable value in the BSDT configuration space 132. All configurable values alternatively may be stored in secure memory space within or related to the hardware security controller 134.

Action logic 136 within the BSDT 118 may compare the spam count to the outbound threshold spam count and if the threshold is surpassed, then action logic 136 may perform additional tasks related to the current and future spam packets. In many embodiments, the outbound threshold spam count is configurable as a threshold spam count over a given window of time (e.g. 500 spam packets per hour may be the threshold).

Once the spam threshold has been exceeded, action logic 136 within the BSDT 118 may inform the hardware security controller 134 that the local computer system may be a botnet device that sends out spam purposely. The hardware security controller 134 may then inform a local Internet Service Provider (ISP) 154 of these issues through a secure tunnel/channel. The BSDT 118, through the hardware security controller 134, may send spam statistics to the ISP 154 as well as potentially sending the content of one or more of the packets that have been marked as spam. The ISP 154 may analyze this information and send back commands/instructions to the hardware security controller 134 as to how to proceed. In other embodiments, the hardware security controller 134 may communicate with an IT management center in an enterprise environment or any other type of entity that sends and receives message packets with the local computing platform.

In some embodiments, the hardware security controller 134 may dictate to the BSDT 118 that all future spam-marked packets that are passed through the BSDT 118 are not allowed to be sent anywhere external to the local computer system 100. In other words, gates 148-152 may block all spam-marked packets from leaving the system across the LAN 124, WiFi 126, WiMax 128, or any other external communication channel. In other embodiments, the BSDT blocks all packets from leaving the system.

In some embodiments, the instructions on how to handle packets once the outbound spam threshold has been surpassed already reside within the BSDT 118. In these embodiments, the BSDT 118 can proactively block spam-marked packets from leaving the system without requiring assistance from the ISP.

In some embodiments, if a human communication message packet passes through the BSDT 118 within the delta time threshold so that it is not considered potential spam, the BSDT 118 may attach a human presence validation receipt to the packet, which tells any remote system receiving the packet that the packet has been verified as being produced while a human presence is at the originating computer. Thus, in some embodiments, a recipient can have its own receiving policies based on its own spam counters using the attached human presence validation receipts on the received packets.

Another major email protocol is the Microsoft® Exchange server protocol. This is a closed protocol and thus the BSDT 118 cannot see the contents of these packets. When an Exchange server protocol (or any other proprietary protocol) packet is detected, the BSDT 118 may directly send secure time stamped human input information directly to the proprietary server 156. When the time stamped human input information is sent to the proprietary server 156, the server itself may make the spam decisions and inform the BSDT 118 of any necessary action to take once a decision has been made.

Figure 2:
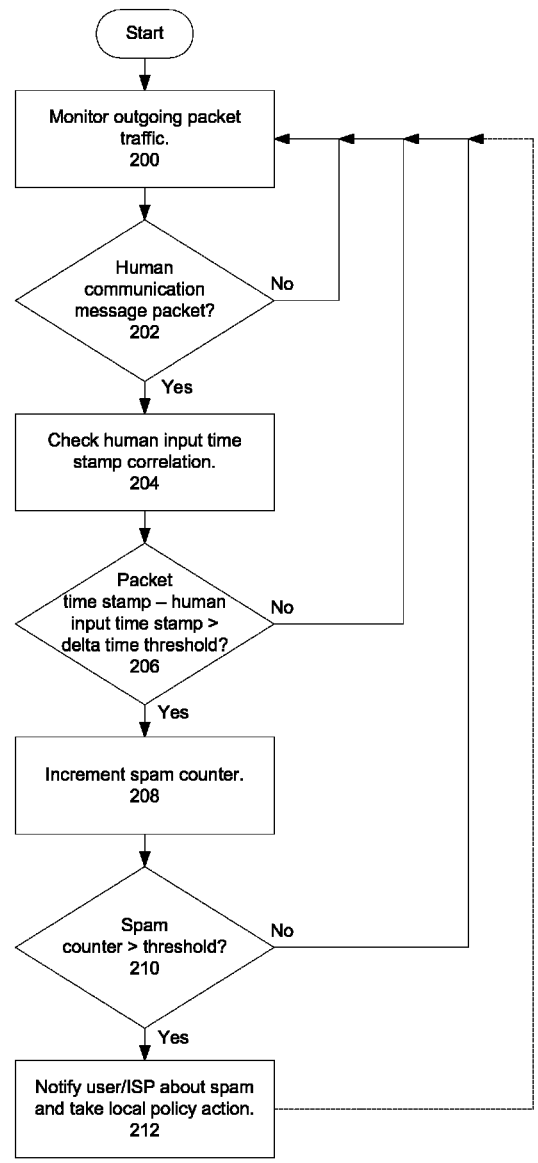
FIG. 2 is a flow diagram of an embodiment of a process to detect botnet spam at the computer that is the source of the spam.

FIG. 2 is a flow diagram of an embodiment of a process to detect botnet spam at the computer that is the source of the spam. The process is performed by processing logic that may comprise hardware, software, or a combination of both. Turning now to FIG. 2, the process begins by processing logic in a local computer system monitoring the outgoing packet traffic (processing block 200).

Processing logic then determines (per packet) if the packet is a human communication message packet (processing block 202). If the packet is not a human communication message packet, then processing logic returns to block 200 to continue monitoring outgoing packet traffic. Otherwise, if the packet is a human communication message packet, then processing logic checks for any human input time stamp correlation with the packet (processing block 204).

Processing logic looks at the correlation and determines whether or not the difference in time between the packet time stamp and the human input time stamp is greater than a delta of time threshold value (processing block 206). If the threshold value has not been exceeded, then processing logic returns to block 200 to continue monitoring outgoing packet traffic. Otherwise, if the threshold has been exceeded, then processing logic increments the spam counter (processing block 208).

Next processing logic determines if the spam counter has exceeded the spam counter threshold (processing block 210). This could be a simple number threshold or a number of spam-marked packets over a given period of time. If the spam counter has not exceeded the threshold, then processing logic returns to block 200 to continue monitoring outgoing packet traffic. Otherwise, if the spam threshold has been exceeded, then processing logic will notify the ISP (or enterprise IT center) the local computer is connected to about the spam problem and potentially will also notify the user of the local computer itself. Processing logic may also take a local policy action, such as blocking any additional spam-marked packets from being sent to a location external to the local computer system (e.g. a remote computer system target elsewhere on the Internet). Then processing logic can either permanently implement the local policy action, which may end the process, or return to block 200 with a new policy. For example, spam-marked emails may still be allowed to be sent external to the system, but a new lower spam threshold value is set and if the second threshold value is exceeded then a blocking policy may commence.

Figure 3:
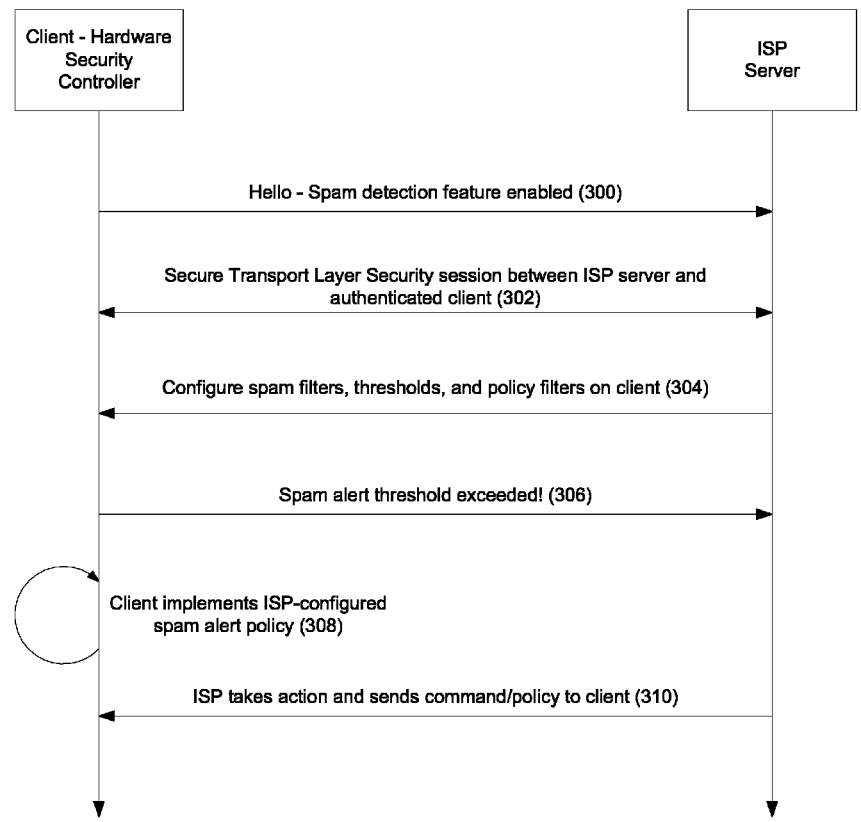
FIG. 3 describes an embodiment of a communication exchange between a client implementing botnet spam detection policies and an ISP server

FIG. 3 describes an embodiment of a communication exchange between a client implementing botnet spam detection policies and an ISP server. The exchange begins with the client, through a hardware security controller, sending a hello communication to the ISP that informs the ISP that the local spam detection feature is enabled on the client system (300).

At this point, a secure transport layer security session between the ISP server and an authenticated client is initiated (302). An example of this type of security session can be found in communications between Intel® AMT-enabled computer systems. Once the session has been initiated, the ISP server sends configuration information to the client including any spam filter configuration data, spam and delta time threshold values, and policy filters for the different types message packets seen by the client (304).

The client now begins operating normally and then at some point, the spam threshold is exceeded on the client so the client sends the ISP an alert notification that the client's spam threshold has been exceeded (306). The client at this point implements the spam alert policy (308) that was sent to the client from the ISP in communication 304. The client continues to implement the spam alert policy until the ISP takes action and sends new commands/policies to the client (310) in response to the spam alert. The communication can then continue based on the new commands/policies sent.

Thus, embodiments of a method and device of a botnet spam detection and prevention technology are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
   determining that a packet attempting to be sent from a first computer system comprises at least a portion of a human communication message that can contain spam;
   computing a difference in time value by comparing a packet origination time value in a time stamp within the packet and a second time value of a most recent activity from at least one human input device coupled to the first computer system, the most recent activity from the at least one human input device corresponding to the at least one human input device relaying data into the first computer system in response to operation of the human input device by a human;
   incrementing a spam counter when the difference in time value is greater than a threshold difference in time value; and
   disallowing the packet to be sent to a location external to the first computer system if the spam counter exceeds a spam outbound threshold value.

2. The method of claim 1, further comprising:
   sending a notification to one or more computer systems external to the first computer system when the spam outbound threshold value has been exceeded by the first computer system.

3. The method of claim 2, further comprising:
   saving human communication message-related information from the packet that caused the spam email counter to increment; and
   sending the saved human communication message-related information to the one or more external computer systems with the notification.

4. The method of claim 1, further comprising:
   attaching a human presence validation receipt to the packet attempting to be sent when the authenticity of the at least one human input device activity has been verified and the local trusted time source time stamp of the at least one human input device activity is not greater than the threshold different in time value from the time stamp within the packet.

5. The method of claim 4, further comprising:
   indicating to one or more computer systems external to the first computer system receiving the packet that the packet likely contains spam when the human presence validation receipt is not attached to the packet.

6. The method of claim 1, wherein the human communication message is one of an email message, a voice over internet protocol (VoIP) message, a web account registration message, a blog comment message, and a short message service (SMS) message.

7. A device, comprising:
   botnet spam detection technology (BSDT) logic, coupled to a first computer system, the BSDT logic to:
   determine that a packet attempting to be sent from the first computer system comprises at least a portion of a human communication message that can contain spam;
   compute a difference in time value by comparing a packet origination time value in a time stamp within the packet and a second time value of a most recent activity from at least one human input device coupled to the first computer system, the most recent activity from the at least one human input device corresponding to the at least one human input device relaying data into the first computer system in response to operation of the human input device by a human;
   increment a spam counter when the difference in time value is greater than a threshold difference in time value; and
   disallow the packet to be sent to a location external to the first computer system if the spam counter exceeds a spam outbound threshold value.

8. The device of claim 7, wherein the BSDT logic is further operable to:
   send a notification to one or more computer systems external to the first computer system when the spam outbound threshold value has been exceeded by the first computer system.

9. The device of claim 8, wherein the BSDT logic is further operable to:
   save human communication message-related information from the packet that caused the spam email counter to increment; and send the saved human communication message-related information to the one or more external computer systems with the notification.

10. The device of claim 7, wherein the BSDT logic is further operable to:
attach a human presence validation receipt to the packet attempting to be sent when the authenticity of the at least one human input device activity has been verified and the local trusted time source time stamp of the at least one human input device activity is not greater than the threshold different in time value from the time stamp within the packet.

11. The device of claim 10, wherein the BSDT logic is further operable to:
indicate to one or more computer systems external to the first computer system receiving the packet that the packet likely contains spam when the human presence validation receipt is not attached to the packet.

12. The method of claim 1, further comprising:
verifying the authenticity of the at least one human input device activity using a verifiably secure hardware security controller in the first computer system.

13. The method of claim 12, further comprising:
stamping the time of the verified at least one human input device activity using a local trusted time source from the hardware security controller.

14. The device of claim 7, further comprising:
a verifiably secure hardware security controller; and
hardware security controller logic, coupled to the first computer system, to verify the authenticity of the at least one human input activity.

15. The device of claim 14, wherein:
the hardware security controller includes a local trusted time source circuit to generate time stamps; and
the hardware security controller logic is further operable to stamp the time of the verified at least one human input device activity using the trusted time source.

* * * * *